United States Patent [19]

Hohl et al.

[11] Patent Number: 4,630,301
[45] Date of Patent: Dec. 16, 1986

[54] VOICE ACTIVATED ECHO GENERATOR

[75] Inventors: G. Burnell Hohl, Norwalk, Conn.; Martin Calvin, Livingston, N.J.

[73] Assignee: Well Made Toy Manufacturing Corp., Long Island City, N.Y.

[21] Appl. No.: 741,286

[22] Filed: Jun. 4, 1985

[51] Int. Cl.⁴ .............................................. G10L 5/00
[52] U.S. Cl. .................................. 381/36; 360/74.1; 381/63; 434/185; 365/45
[58] Field of Search ..................... 381/31, 36, 63, 110; 360/74.1; 365/45; 434/185

[56] References Cited

U.S. PATENT DOCUMENTS 4,318,188  3/1982  Hoffman ............................... 381/51
4,389,915  6/1983  Bione ................................... 381/63
4,413,290  11/1983 Furuta ................................. 360/74.1

Primary Examiner—E. S. Matt Kemeny
Attorney, Agent, or Firm—Marmorek, Guttman & Rubenstein

[57] ABSTRACT

A voice activated echo generator employs digital voice recording technology to digitize several spoken words of audio using low-cost encoding techniques. The audio information is stored in dynamic memory and is played back by reconverting the data back from its digitized form to audio, which then drives a loudspeaker. The echo generator has many design parameters which can be varied, such as, duration of recorded speech, voice actuation sensitivity, number of playback repetitions, speech quality, playback speed, playback pitch, and playback volume. For a toy, an input speech threshold initiates a distinct record interval followed by a substantially immediate and automatic playback interval during which the echo is generated without the problem of acoustic feedback.

4 Claims, 2 Drawing Figures

VOICE ACTIVATED ECHO GENERATOR

BACKGROUND AND SUMMARY OF THE INVENTION

This invention relates to echo generators which are usable in applications which require rapid and automatic repetition of a spoken word or phrase. Such applications include both toys and commercial applications. One such commercial application is as a speech learning aid for the deaf.

Existing echo generators may not be usable in the above applications because of many drawbacks. These drawbacks include (1) the echo generators are not voice activated and (2) the echo generators cost too much for use in the desired applications.

This invention addresses the above enumerated drawbacks. This invention relates to a novel echo generator that is usable in applications which require rapid and automatic repetition of a spoken work or phrase. The echo generator can be voice activated. It utilizes known modulation techniques and existing readily-available circuit components. Thus, a low-cost voice activated echo generator results.

DESCRIPTION OF PREFERRED EMBODIMENT

Figure 1:
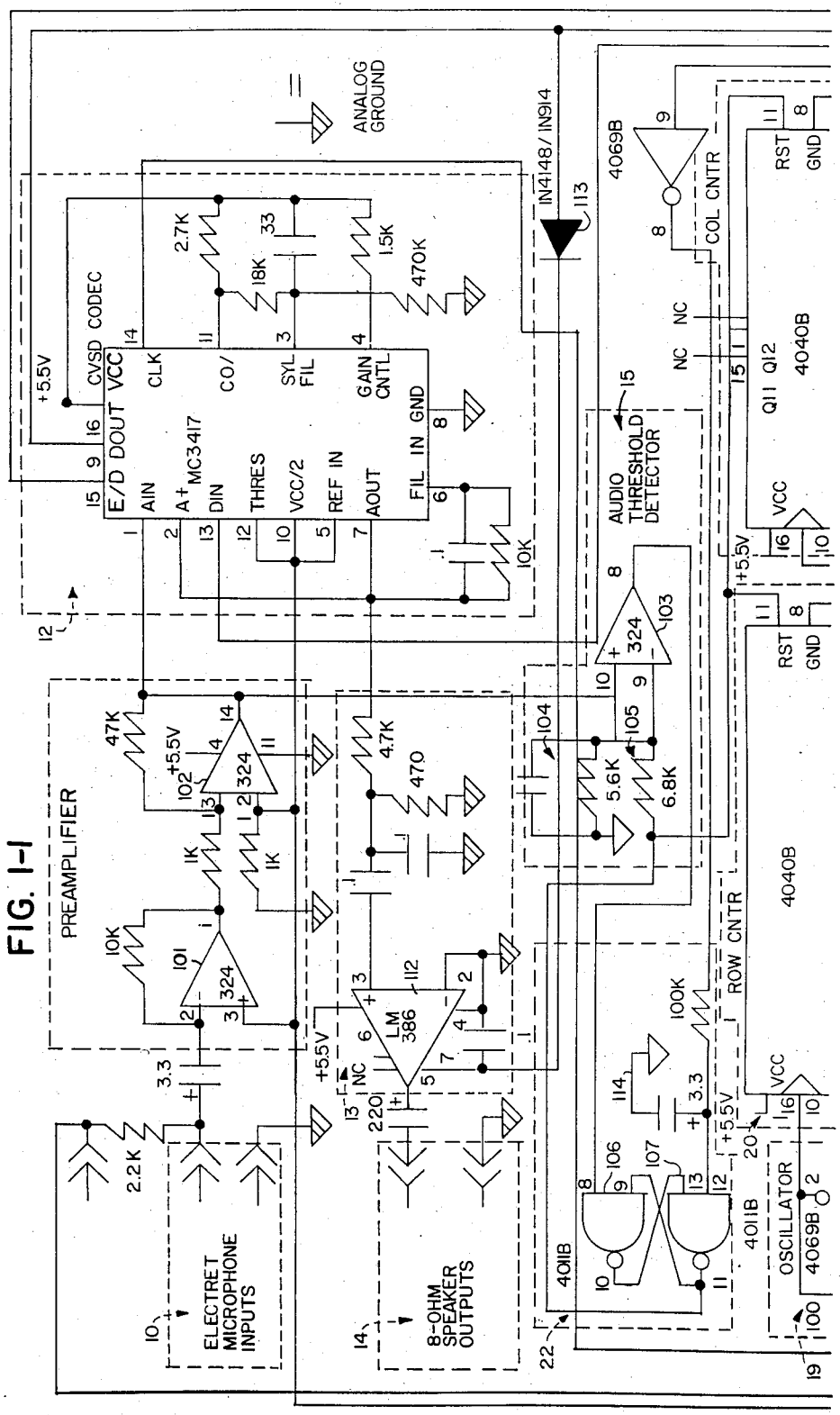
FIG. 1 is a schematic drawing of the voice activated echo generator.
Figures 1, 2:
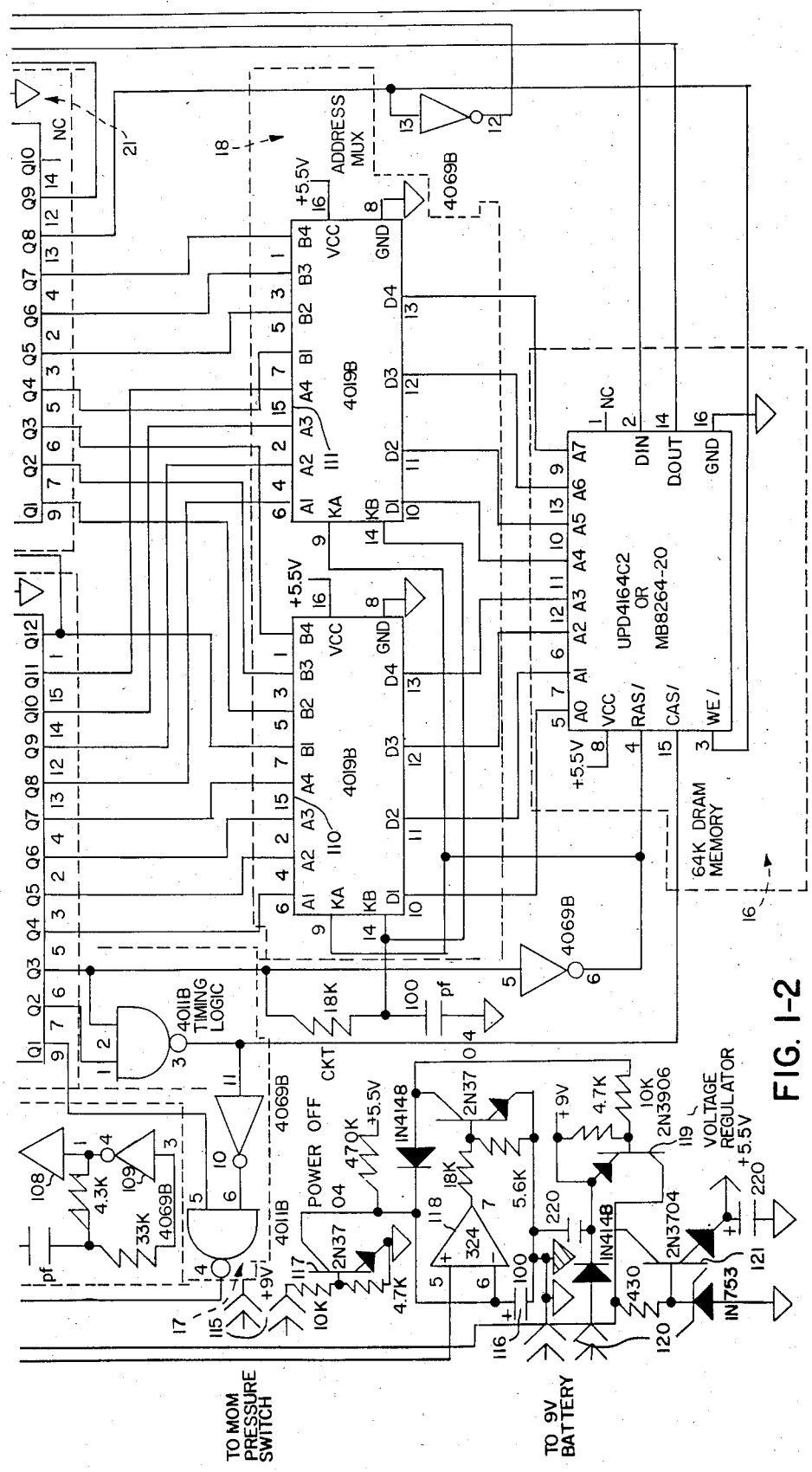
FIG. 2 is a block diagram of the voice activated echo generator.
Figure 2:
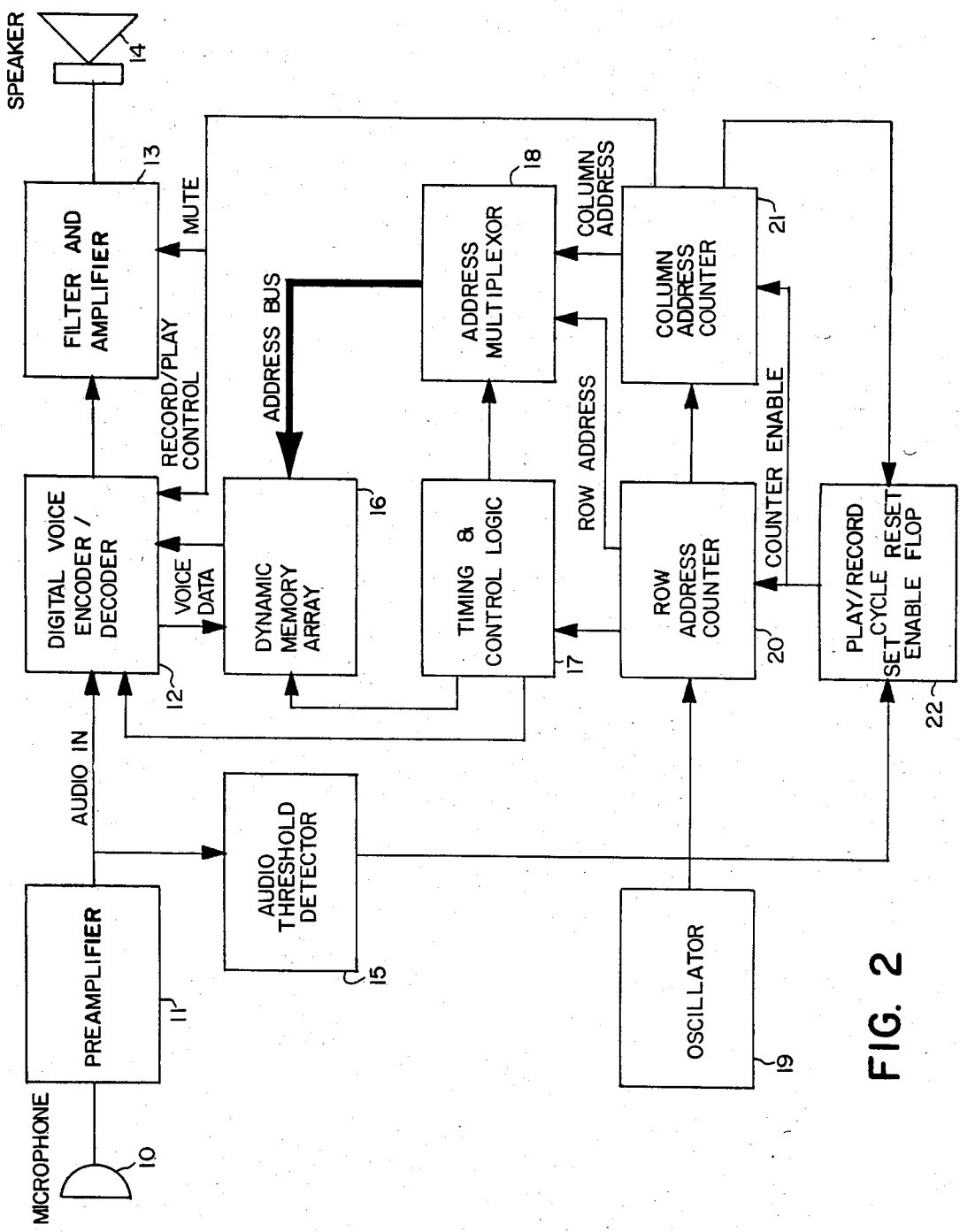

This preferred embodiment is for a voice activated echo generator that has been optimized for an electronic toy application. The toy is assumed to run off the energy supplied by a portable battery.

The output of an inexpensive electret microphone 10 is amplified through two LM324 operational amplifier stages 101 and 102, in a standard inverting amplifier configuration. While these are not low-noise devices, they form an inexpensive preamplifier 11, to boost the output of microphone 10 to about 2 volts peak-to-peak. This output becomes the input 100 to a Motorola 3417 continuously variable slope delta modulation ("CVSD") codec chip 12. Delta codec 12 is designed with minimum component count, employing a simple single-pole integration filter, and a 6 millisecond time-constant syllabic filter. The minimum voltage step size of delta codec 12 is set at 25 millivolts.

A third LM324 operational amplifier 103 forms a threshold detector 15 which compares the input audio level against a fixed voltage threshold, set by a two-resistor voltage divider 104 and 105. When an audio signal trips detector 15, it sets flip-flop 22, formed by cross-coupled 4011B NAND gates 106 and 107. This initiates a recond/playback cycle. It also removes the reference voltage on the threshold detector 15, disabling it during the record cycle. Additionally, LM386 audio power amplifier 112 is muted through 1N4148 diode 113; muting the amplifier during the record cycle prevents acoustic feedback.

Voice data is stored in a 64 K×1 dynamic random access memory ("DRAM") 16. Within the memory array of the DRAM 16, each storage cell of a given row is consecutively accessed, before the column address is incremented. Delta codec 12 is clocked at about 64 kilohertz. Because a memory cell is accessed during each clock cycle of delta codec 12, a memory access occurs approximately every 16 microseconds; This interval is approximately the recommended refresh interval. Adherence to strict refresh timing requirements is not critical in this application because adaptive delta-modulation voice encoding is tolerant of an occasional data bit error.

Two 4040B counters 20 and 21 generate the record and playback timing, delta modulator clock, RAS timing, and CAS timing for DRAM 16. Setting flip-flop 22 removes reset signals to counters 20 and 21; counters 20 and 21 can now increment. Counter 20 generates an RAS signal and a CAS signal which are sent to DRAM 16. DRAM 16 is initially in write mode: delta codec 12 is encoding the audio input and supplying data 108 to DRAM 16. Counters 20 and 21 are driven by a free-running RD oscillator 19, which runs at a nominal frequency of 500 kilohertz. Oscillator 19 is formed from two complementary metal oxide semiconductor ("CMOS") 4069B inverters 108 and 109. During the nominal one-second record cycle, the row address of the memory array in DRAM 16 is formed by bits Q4 through Q11, inclusive, of the low-order counter 20, and the column address of the memory array in DRAM 16 is formed by bit Q12 and the low-order seven bits of the high-order counter 21.

The row and column addresses from counters 20 and 21 are multiplexed, through two 4019B data selectors 110 and 111, onto the address bus of the DRAM 16. The multiplexed signal is switched between the low-going edges of the RAS and CAS strobes generated by the counter timing logic 17.

When high-order bits Q8 and Q9 of column address counter 21 are set during the incrementing process, signals are outputted from counter 21 which cause termination of the record cycle and commencement of a playback cycle. During the playback cycle, counters 20 and 21 recycle once, reading encoded audio data from DRAM 16. At the outset of the playback cycle, delta codec 12 is switched to decoding mode and amplifier 13 is unmuted through 1N4148 diode 113. The encoded audio data in DRAM 16 is fed into delta codec 12 and decoded there. The analog output of delta codec 12 is divided down and low-passed filtered through a resistance-capacitance ("RC") network, and AC-coupled to an LM386 audio power amplifier 112, which drives a small 8 ohm loudspeaker 14. At the end of the playback cycle, the setting of bit Q9 of column address counter 21 resets the cycle flip-flop 22, reenabling audio threshold detector 15 to await the next spoken word. A power-on reset RC network 114 also is provided, to the reset side of flip-flop 22, to assure that the circuit powers up in an idle state.

Pressing the momentary "ON" switch 115 discharges a 100 microfarad capacitor 116 (through a 2N3704 open collector transistor 117) that feeds a voltage comparator, formed by LM324 operation amplifier 118. Simultaneously, a 2N3906 PNP transistor 119 is turned on to supply 9 volts from the battery 120 to a 2N3704 transistor 121 whose base voltage is held constant by a zener diode, to supply 5.5 volts to the circuit. Once the circuit has powered up, LM324 comparator 118 maintains the supply voltage, until the 100 microfarad capacitor 116 charges to trip comparator 118 and automatically turn off power. This action conserves battery life.

Battery drain in idle, powered-up mode is approximately 25 milliamps.

The echo generator will function properly from a battery voltage as low as 6 volts.

I claim:

1. A voice-activated echo generator circuit for use in an electronic toy comprising:
   (a) microphone means for producing an analog audio signal in response to sound received thereby
   (b) threshold detection means responsive to said analog audio signal for initiating a record/playback cycle, said record/playback cycle comprising a distinct record interval automatically followed by a distinct playback interval,
   (c) means, active during said record interval, for digitally coding said analog audio signal received during said record interval,
   (d) memory means for storing said digitally coded audio signal formed during said record interval,
   (e) means for automatically initiating said playback interval at the end of said record interval,
   (f) means active during said playback interval, for reading said digitally coded audio signal out of said memory means and for decoding said digitally coded audio signal back into analog audio form, and
   (g) loudspeaker means for broadcasting said analog audio signal to provide an automatic echo of said received sound.

2. A voice activated electronic toy comprising: an electronic echo generator circuit capable of receiving a spoken word or phrase and automatically repeating said word or phrase, said echo generator circuit including;
   a microphone for receiving said spoken word or phrase,
   a threshold detector responsive to said spoken word or phrase for initiating a record/playback cycle, said record/playback cycle comprising a distinct record interval automatically followed by a distinct playback interval,
   means, active during the record interval, for digitally coding said spoken word or phrase,
   memory means for storing said digitally coded spoken word or phrase,
   means for automatically initiating said playback interval at the end of said record interval,
   means, active during said playback interval, for reading said digitally coded word or phrase from said memory and decoding said digitally coded word or phrase, and
   loudspeaker means for broadcasting said digitally coded word or phrase to produce an echo of said spoken word or phrase.

3. The toy of claim 2 wherein said coding and decoding means are formed as part of a single chip.

4. The toy of claim 2 wherein said record interval is of a predetermined duration and said playback interval is of a predetermined duration.

* * * * *

REEXAMINATION CERTIFICATE (3860th)

United States Patent [19]
Hohl et al.

[11] B1 4,630,301
[45] Certificate Issued Sep. 7, 1999

[54] VOICE ACTIVATED ECHO GENERATOR

[75] Inventors: G. Burnell Hohl, Norwalk, Conn.; Martin Calvin, Livingston, N.J.

[73] Assignee: Well Made Toy Manufacturing Corp., Long Island City, N.Y.

Reexamination Request:
No. 90/003,638, Nov. 15, 1994

Reexamination Certificate for:
Patent No.: 4,630,301
Issued: Dec. 16, 1986
Appl. No.: 06/741,286
Filed: Jun. 4, 1985

[51] Int. Cl.[6] .................................................. G01L 5/00
[52] U.S. Cl. ........................ 704/275; 365/45; 381/63; 434/185
[58] Field of Search ................................ 395/2.79, 2.8, 395/2.81, 2.84; 369/31, 63–68; 446/297; 704/275, 270, 272; 365/45; 381/63; 434/185

[56] References Cited

U.S. PATENT DOCUMENTS

| | | |
|---|---|---|
| 3,165,595 | 1/1965 | Noshiro . |
| 3,469,039 | 9/1969 | Lee . |
| 4,144,582 | 3/1979 | Hyatt ........................................ 395/2.84 |
| 4,214,125 | 7/1980 | Mozer et al. ........................... 395/2.77 |
| 4,363,050 | 12/1982 | Modla ...................................... 360/32 |
| 4,458,110 | 7/1984 | Mozer et al. .......................... 395/2.76 |
| 4,528,689 | 7/1985 | Katz ...................................... 395/2.79 |

FOREIGN PATENT DOCUMENTS 2136188  9/1985  United Kingdom .

OTHER PUBLICATIONS

"Solid State Delayed Auditory Feedback System or Speech Therapy," by R. Pollock, N.L. Gregory, and A. Shaw, Biomedical Engineering, vol. 11, 26, Dec. 12, 1976, pp. 413–414.

*Primary Examiner*—D. R. Hudspeth

[57] ABSTRACT

A voice activated echo generator employs digital voice recording technology to digitize several spoken words of audio using low-cost encoding techniques. The audio information is stored in dynamic memory and is played back by reconverting the data back from its digitized form to audio, which then drives a loudspeaker. The echo generator has many design parameters which can be varied, such as, duration of recorded speech, voice actuation sensitivity, number of playback repetitions, speech quality, playback speed, playback pitch, and playback volume. For a toy, an input speech threshold initiates a distinct record interval followed by a substantially immediate and automatic playback interval during which the echo is generated without the problem of acoustic feedback.

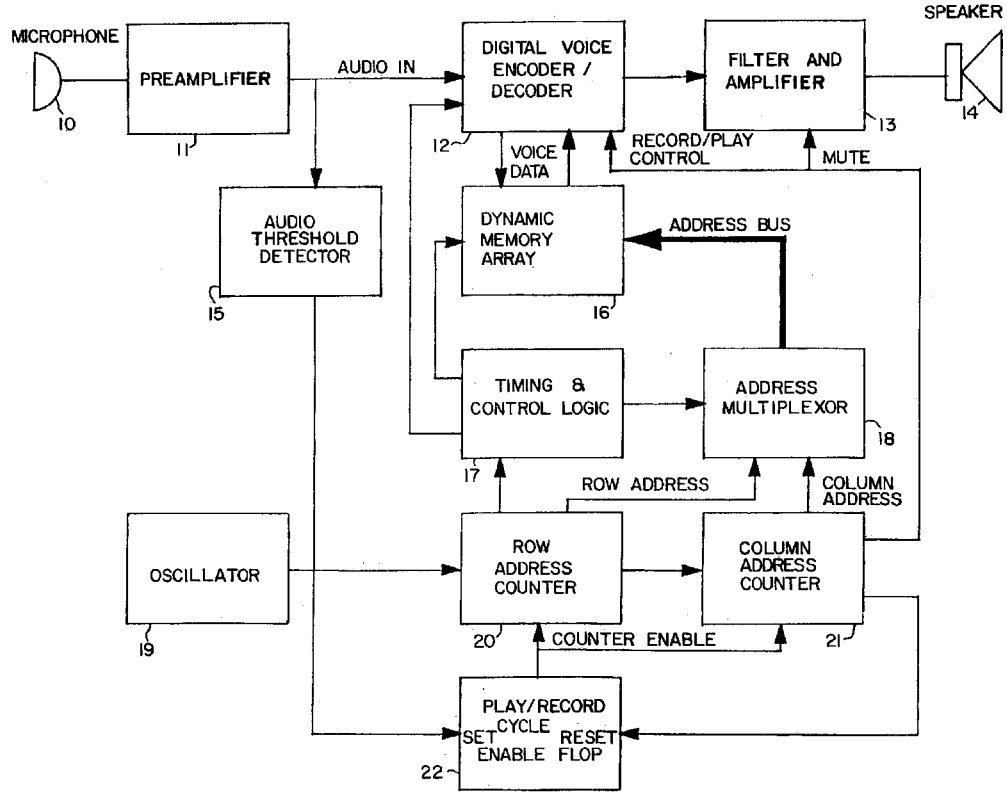

VOICE ACTIVATED ECHO GENERATOR BLOCK DIAGRAM

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1 to 4 are cancelled.

* * * * *